United States Patent [19]

Massengill et al.

[11] 3,884,497

[45] May 20, 1975

[54] INFLATION DIFFERENTIAL CONTROL FOR MULTIPLE BAG RESTRAINT SYSTEM

[75] Inventors: Roy H. Massengill, Brookside; Ernest D. Buff, Bernardsville, both of N.J.

[73] Assignee: Allied Chemical Corporation, New York, N.Y.

[22] Filed: Oct. 30, 1973

[21] Appl. No.: 411,139

[52] U.S. Cl. .......................................... 280/150 AB
[51] Int. Cl. ............................................. B60r 21/08
[58] Field of Search ............................... 280/150 AB

[56] References Cited
UNITED STATES PATENTS

| | | | |
|---|---|---|---|
| 3,582,107 | 6/1971 | Goetz | 280/150 AB |
| 3,642,303 | 2/1972 | Irish et al. | 280/150 AB |
| 3,674,059 | 7/1972 | Stephenson | 280/150 AB |
| 3,758,131 | 9/1973 | Stephenson et al. | 280/150 AB |
| 3,767,225 | 10/1973 | Mazelsky | 280/150 AB |
| 3,768,830 | 10/1973 | Hass | 280/150 AB |

Primary Examiner—David Schonberg
Assistant Examiner—John P. Silverstrim
Attorney, Agent, or Firm—Jonathan Plaut; Ernest D. Buff; R. H. Massengill

[57] ABSTRACT

Multiple bag inflation apparatus adapted to be disposed in a vehicle subject to impact for transmitting an electrical current from a power source to a first gas releasing means connected to a first gas source within a fixed first time interval and to a second gas releasing means connected to a second gas source during a second time interval which varies in inverse proportion to the impact velocity of the vehicle. Inflating gas is released from the first and second gas sources to a first (knee) and a second (torso) bag, respectively, and inflates the knee and torso bags during a time differential which is inversely proportional to the impact velocity of the vehicle.

17 Claims, 4 Drawing Figures

INFLATION DIFFERENTIAL CONTROL FOR MULTIPLE BAG RESTRAINT SYSTEM

BACKGROUND OF THE INVENTION

1. Field of the Invention

This invention relates to a safety device for vehicle passengers, and more particularly to apparatus and method for inflating a plurality of bags in a manner whereby the time differential between inflation of a first (knee) bag and a second (torso) bag varies inversely with the impact velocity of the vehicle.

2. Description of the Prior Art

Inflatable restraint systems have been recently developed which should significantly decrease the number of fatalities and serious injuries resulting from motor vehicle accidents. These systems generally include a source of pressurized gas disposed within a vehicle and apparatus connected to the gas source for releasing gas through an outlet and into an inflatable bag when the vehicle is involved in a collision. In order to prevent occupant dislodgment during the collision it has been proposed to inflate a lower (knee) bag simultaneously with an upper (torso) bag. The knee bag expands to protect the occupant's legs and remains inflated during the collision to maintain the occupant in the normal seated position.

One of the major problems with such multiple bag restraint systems is their inability to adequately protect vehicle occupants such as children, who are frequently not seated in an upright position upon collision of the vehicle. An occupant who is not seated in the upright position upon collision of the vehicle but is, for example, leaning forward toward the instrument panel or standing on the floor of the vehicle behind the instrument panel may be pushed back with considerable force by the rapidly expanding torso bag. The present invention is directed to overcoming the foregoing problem.

SUMMARY OF THE INVENTION

Briefly stated, the invention relates to a multiple bag restraint apparatus for use in a vehicle subject to impact wherein the time differential between inflation of a first (knee) bag and a second (torso) bag varies inversely with the impact velocity of the vehicle. The apparatus has means for transmitting an electrical current from a power source to first gas releasing means connected to a first gas source within a fixed first time interval and to a second gas releasing means connected to a second gas source during a second time interval which varies in inverse proportion to the impact velocity of the vehicle. An impact detecting means causes the current to pass from the power source to a first circuit means upon impact of the vehicle. The first circuit means transmits the current to the first gas releasing means during the first time interval, thereby releasing pressurized gas from the first gas source into the first inflatable bag. A second circuit means transmits current from the power source to the second gas releasing means during a second time interval, thereby releasing pressurized gas from the second gas source into the second inflatable bag. The second time interval is caused to vary inversely with the impact velocity of the vehicle by a control means associated with the second circuit means and responsive to the impact velocity. Gas released from the first and second gas sources flows into and inflates the first and second inflatable bags, respectively, during a time differential which is inversely proportional to the impact velocity of the vehicle.

Further, the invention provides a method of inflating a plurality of inflatable means disposed in a vehicle subject to impact comprising the steps of transmitting an electrical current from a power source to a first gas releasing means connected to a first gas source during a fixed first time interval to effect release of inflating gas into a first inflatable means adapted to protect the legs of a vehicle occupant upon impact of the vehicle; transmitting an electrical current from the power source to a second gas releasing means connected to a second gas source during a second time interval to effect release of inflating gas into a second inflatable means adapted to protect the torso of the occupant upon said impact; and controlling the second time interval in response to the impact velocity of said vehicle to vary the second time interval in inverse proportion to said impact velocity.

A unique method and means is thereby provided for variably controlling the time differential between inflation of the first and second inflatable bags. At relatively low impact velocities, the first (knee) bag inflates prior to the second (torso) bag, thereby causing an occupant who is leaning toward or standing behind the instrument panel to move into an upright position before the second bag is substantially inflated. The sequential deployment of the bags serves to prevent the occupant from rebounding off of the second bag and into hard portions of the vehicle. At relatively high speed impacts, the time differential between inflation of the first and second bags is decreased. The bags function primarily to move the occupant away from the dashboard or other hard portions of the vehicle to prevent contact therewith prior to deployment of the bags. Since the noise associated with inflation of multiple bag restraint systems is greatest if the bags are inflated simultaneously, and since in accordance with the present invention the bags are inflated during a preselected time differential which is necessary to best protect the occupant at each impact velocity, it is also possible to reduce the sound resulting from inflation. Accordingly, the invention affords increased protection against rebound and sound problems and, in general, results in a safer disposition of the bags when a vehicle which carries them is involved in a collision.

BRIEF DESCRIPTION OF THE DRAWINGS

The invention will be more fully understood and further advantages will become apparent when reference is made to the following detailed description of the preferred embodiment of the invention and the accompanying drawings in which.

DESCRIPTION OF THE PREFERRED EMBODIMENTS

The inflation time differential control means of the present invention may be fabricated in a number of relatively simple configurations. As a consequence, the method and apparatus of this invention can be practiced with most types of multiple bag restraint systems known in the art. For illustrative purposes, the invention is described in connection with apparatus having a plurality of bags, each being connected to a hybrid gas source containing pressurized gas and a charge of gas generating material. A single bag having a plurality of separate compartments, or bag portions, could also be used. Moreover, the number of gas generating charges of each gas source may be as great as ten or more depending on the size of each charge, the pressure and volume of gas required for inflation, the range of impact velocities within which the apparatus is intended to function and the quantity of pressurized gas employed. Further, the inflating gas can be supplied from a gas source employing either stored or generated gas solely. Accordingly, the invention is intended to encompass modifications which use a plurality of gas sources to inflate a plurality of bags in a manner whereby the time differential between inflation of a first and second of the bags varies inversely with the impact velocity.

Figure 1:
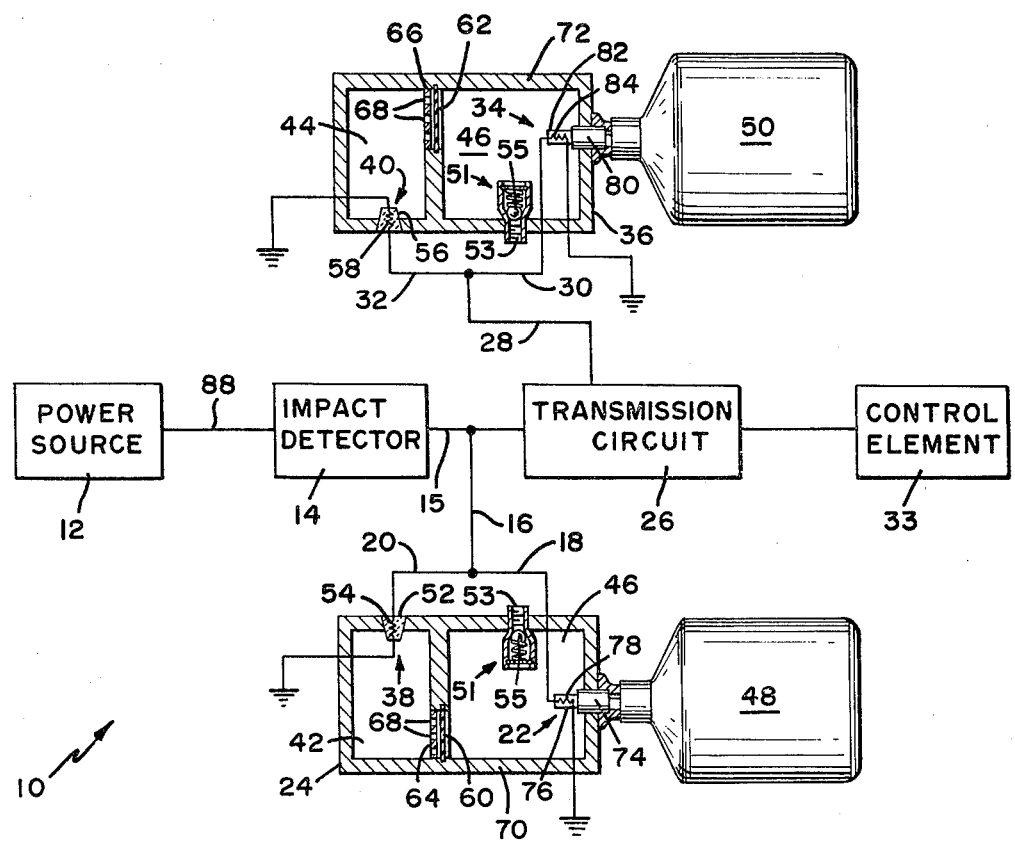
FIG. 1 is a diagrammatic representation of apparatus for transmitting an electrical current to a first gas releasing means connected to a first gas source within a fixed first time interval, and to a second gas releasing means connected to a second gas source during a second time interval which varies in inverse proportion with the impact velocity of the vehicle.

Referring to FIG. 1 of the drawings, the multiple bag restraint apparatus is shown generally at 10. The apparatus has a power source 12 which may comprise a battery of the type conventionally used in a motor vehicle. An auxiliary power supply, such as a capacitor connected in parallel to the battery, may be used as the power source in the event that the battery is not supplying power to the apparatus 10. The apparatus 10 further includes an impact detector 14 and a control element 33. A first circuit means, comprising lead wires 16 and 18, is connected to impact detector 14 and a gas releasing means, indicated generally at 22, of a first gas source 24. A second circuit means comprising transmission circuit 26 and lead wires 28 and 30 is connected to impact detector 14 and a gas releasing means, indicated generally at 34, of a second gas source 36. The first and second circuit means are respectively connected by lead wires 20 and 32 to actuating means indicated generally at 38 and 40, associated with gas generating charges 42 and 44 of first and second gas sources 24 and 36. Pressurized gas 46 is stored within each of first and second gas sources 24 and 36. Impact detector 14 causes an electrical current to pass from power source 12 to the first and second circuit means upon impact of a vehicle in which the apparatus 10 is disposed. The first circuit means transmits the current to (1) the first gas releasing means 22 and (2) lead wire 20 and actuating means 38 during a first time interval, thereby releasing inflating gas from first gas source 24 into a first inflatable bag 48. Current is transmitted through the second circuit means to (1) second gas releasing means 34 and (2) lead wire 32 and actuating means 40 during a second time interval, thereby releasing inflating gas from second gas source 36 into a second inflatable bag 50. The control element 33 is responsive to the impact velocity of the vehicle and cooperates with the second circuit means to vary the second time interval inversely with the impact velocity. The first time interval remains fixed. Gas released independently from the first and second gas sources flows into and inflates the first and second bags, respectively, in a manner whereby the time interval between inflation of the first (knee) and second (torso) bags varies in inverse proportion to the impact velocity.

Each of the gas sources 24 and 36 utilizes a hybrid combination of pressurized gas and gas generating material. Nitrogen, air, argon, helium, mixtures of argon with helium or other suitable gases which can be stored for prolonged periods without leaking from a gas-containing vessel are generally used as the pressurized gas. Black powder, nitrocellulose, composite propellant such as ammonium perchlorate and polyvinyl chloride, or other material which generates gas and heat upon combustion can be used as the gas-generating material of which the gas-generating charges are comprised. The pressurized gas is normally stored within a gas containing portion at pressure in the range of about 1,000 to 3,000 pounds per square inch. In order to accommodate such pressure the second gas source has a gas containing portion, the volume of which ranges from about 50 to 150 cubic inches, and preferably about 100 cubic inches. The first gas source is adapted to fill a smaller (knee) bag than the second gas source, and may therefore have a gas containing portion somewhat smaller in volume than the gas containing portion of the first gas source, as in the order of 10 to 100 cubic inches and preferably about 25 cubic inches. Pressures exerted within the gas containing portion 36 by admixture of the stored and generated gases may increase the pressure in the gas containing portion to a pressure in the range of 3,000–7,000 psi or more.

Each of the gas containing portions has a gas inlet means shown generally at 51. Gas inlet means 51 may include a tapped hole 53 adapted to communicate with a source of pressurized gas (not shown) and a ball check valve 55. The use of the check valve 55 is preferred in order to prevent back flow of the pressurized gas 46. As illustrated, the gas inlet means 51 is located at the upstream end of the gas containing portion. It should be appreciated that this position of the inlet means 51 is optional and that in other forms of the inflation apparatus 10 the inlet means 51 may be located elsewhere on the gas containing portion. The gas-containing portion is filled by injecting a pressurized gas 46 through the gas inlet means 51 until a preselected pressure is attained within the gas-containing portion.

The volume and pressure of the pressurized gas 46 selected for each gas source will depend upon the volume of the inflatable bag associated therewith and the pressure and volume of gas produced by its gas-generating charge. For example, in the embodiment shown in FIGS. 1 and 4, the volume and pressure of the pressurized gas 46 should be at least about 25 percent of the combined volume and pressure of gas generated by combustion of the gas generating charge associated therewith. The volume of gas stored within each of the gas containing portions can be varied in order to maximize the high pressure gas potential and minimize the volume of the gas generating source with which it is associated. Usually, the pressurized gas is stored within each of the gas containing portions in sufficient pressure and volume to substantially fill the bag associated therewith.

Actuating means 38 and 40 include a squib 52 and 56, respectively. Squib 52 is structurally connected to a resistance element, such as a bridge wire 54, which provides a suitable volume resistivity to heat and ignites squib 52, upon passage of an electrical current therethrough. The bridge wire 54 is electrically connected via line 20, the first circuit means and line 15 to impact detector 14, which electrically connects the bridge wire 54, line 20, the first circuit means and line 15 to power source 12 upon impact of a vehicle in which the apparatus 10 is disposed. Gas generating material of charge 42 is disposed adjacent to the squib 52. In like manner gas generating material of charge 44 is disposed adjacent to squib 56 of actuating means 40. Squib 56 is structurally connected to a resistance element such as bridge wire 58, which provides substantially the same volume resistivity as bridge wire 54 upon passage of an electrical current therethrough. The bridge wire 58 is electrically connected via lines 32 and 28, transmission circuit 26 and line 15 to impact detector 14, which electrically connects the bridge wire 58, lines 32 and 28, transmission circuit 26 and line 15 to power source 12 upon impact of the vehicle.

Figure 4:
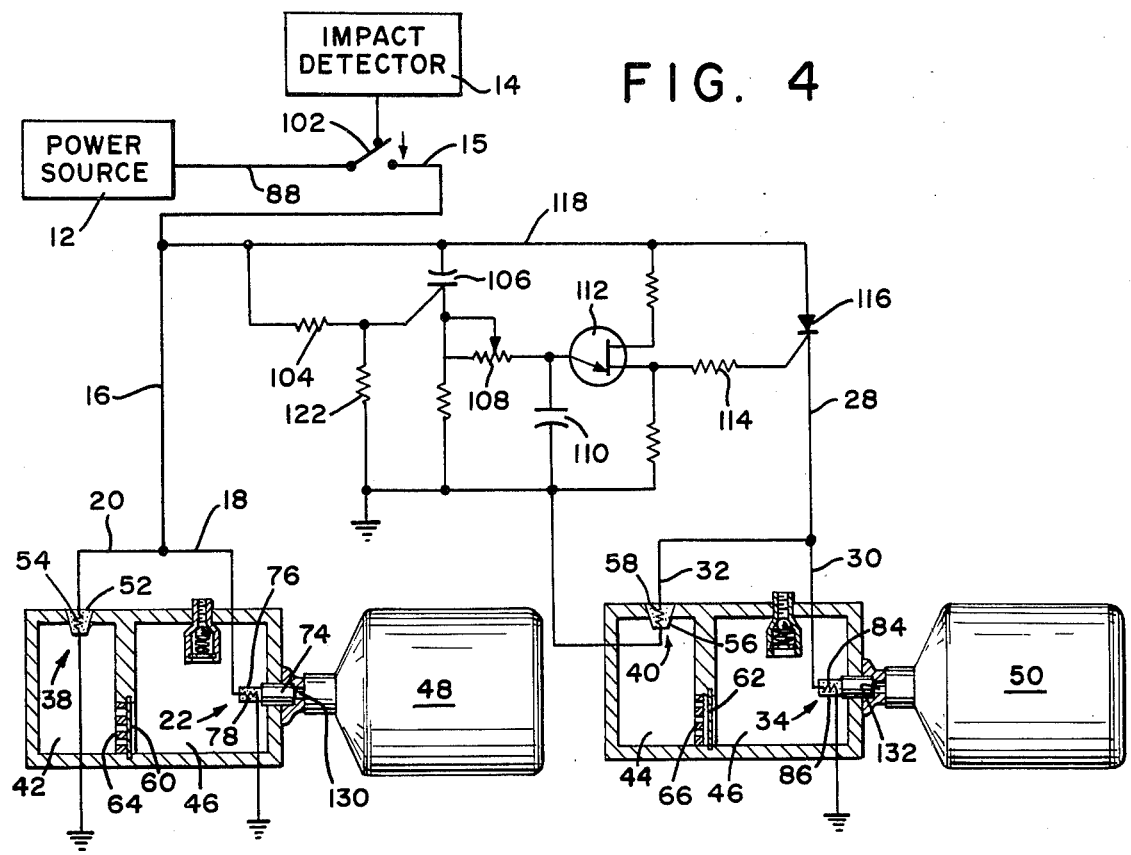
FIG. 4 is a schematic electrical diagram of a first and second circuit means, the second circuit means having electronic means for controlling the time interval during which an electrical current is transmitted from a power source to the second gas releasing means.

In each of the hybrid gas sources shown in FIGS. 1 and 4, the gas containing portion and the gas generating charge are respectively housed within separate compartments of a pressurized tank. Means are provided for permitting gas developed by combustion of the gas generating charge to flow into the gas containing portion. Such means may comprise a pressure sensitive barrier, associated with the compartment housing the gas generating charge. In the embodiment shown, for example, a pressure-sensitive barrier 60 provides a wall separating charge 42 from the pressurized gas 46. The gas generating charge 44 is similarly separated from the pressurized gas 46 by barrier 62. Each of the barriers 60 and 62, which may be constructed of plastic or other suitable material, is designed to rupture when the pressure of gas generated by combustion of the charge with which it is respectively associated exceeds a preselected pressure, as in the range of approximately 3,000 to 5,000 pounds per square inch. Alternatively, either barrier can be removed after generation of the preselected pressure within its respective compartment by exploding an explosive charge (not shown) upon receipt of an electrical current from the power source 12. In the embodiment illustrated in FIGS. 1 and 4, each of the barriers 60 and 62 is generally aligned with the axis of the gas containing portion of the gas source with which it is associated. This disposition of the barriers 60 and 62 in relation to the gas containing portions permits a simple and efficient flow of gas generated in the gas generating portions through the gas containing portions.

Diffusers 64 and 66 are disposed at the downstream ends of the compartments in which the gas generating charges are respectively housed and immediately upstream of the barriers 60 and 62. The diffusers contain a plurality of passageways 68 which cause gas generated by combustion of the charges 42 and 44 to move into the gas containing portions at a uniform pressure and velocity.

Because of the pressures which are maintained within the gas containing portions, the gas sources are provided with relatively thick housings 70 and 72. The thickness of the housings 70 and 72 is designed to insure the structural integrity thereof if the housings 70 and 72 are subjected to pressures in excess of those anticipated. Preferably the housings 70 and 72 are constructed of steel or other suitable metal.

Each of the first and second gas releasing means 22 and 34 is disposed within the gas containing portion of the gas source with which it is associated at the downstream end of the housing. First gas releasing means 22 includes an outlet plug 74 removably mounted within the housing 70, the plug 74 extending through a full thickness of the housing 70 and into contact with the pressurized gas 46 contained therein. An explosive charge, such as a detonator 76 is located adjacent to the plug 74. Detonator 76 is structurally connected to a resistance element, such as a bridge wire, 78. The bridge wire 78 is electrically connected through lines 18, 16 and 15 to power source 12 by impact detector 14 upon impact of the vehicle. In like manner, second gas releasing means 34 includes an outlet plug 80 removably mounted within the housing 72. The plug extends through a full thickness of the housing 72 and into contact with the pressurized gas 46 contained therein. An explosive charge such as a detonator 82 is located adjacent to the plug 80. Detonator 82 is structurally connected to a resistance element, such as a bridge wire 84. The bridge wire 84 is electrically connected through lines 30 and 28, transmission circuit 26, and line 15 to power source 12 by impact detector 14 upon impact of the vehicle.

Figure 2:
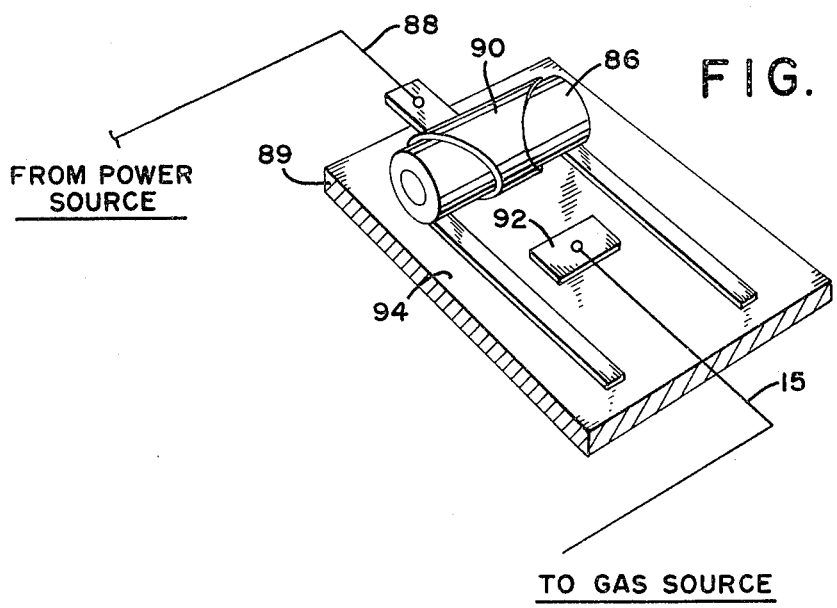
FIG. 2 is an isometric view of an impact detecting means for use with the apparatus of FIG. 1.

In FIG. 2 there is illustrated one form of an impact detecting means. Other forms of impact detecting means can also be used. Such means may include at least one roller 86 of metal such as stainless steel, gold plated copper, or other suitable conductive material. The roller 86 is electrically connected via lines 88 to the power source 12 and is movably mounted on a non-conductive support 89 made, for example, of plastic, polycarbonate glass or ceramics. A thin band of electroconductive material 90, such as stainless steel, gold plated copper or the like, wrapped around the roller 86 and spot welded or otherwise secured to support 89 provides a resisting force, hereinafter referred to as the first resisting force, against which the roller 86 acts. Conductive element 92, comprised of electroconductive material of the type used to make band 90, is fixedly mounted on support 89 and electrically connected through the first circuit means to the first gas releasing means 22. If roller 86 is displaced along the surface 94 of support 89 in the direction of the arrow by forces resulting from impact of the vehicle, band 90 is brought into contact with the conductive element 92. An electrical current is transmitted during a fixed first time interval from the power source 12 through line 88, impact detector 14 and a first circuit means comprising lines 16 and 18 to the detonator 76 of gas releasing means 22. Current carried by the first circuit means is transmitted to ground through line 20 and bridge wire 54 of actuating means 22. In addition, the current is transmitted to ground during a second time interval through (1) transmission circuit 26, lines 28 and 30 and bridge wire 84 of detonator 82 for gas releasing means 34 and (2) transmission circuit 26, lines 28 and 32 and bridge wire 58 of squib 56 for actuating means 40. The second time interval is varied in inverse proportion to the impact velocity of the vehicle by a control means associated with the second circuit means as described hereinafter in more detail.

Figure 3:
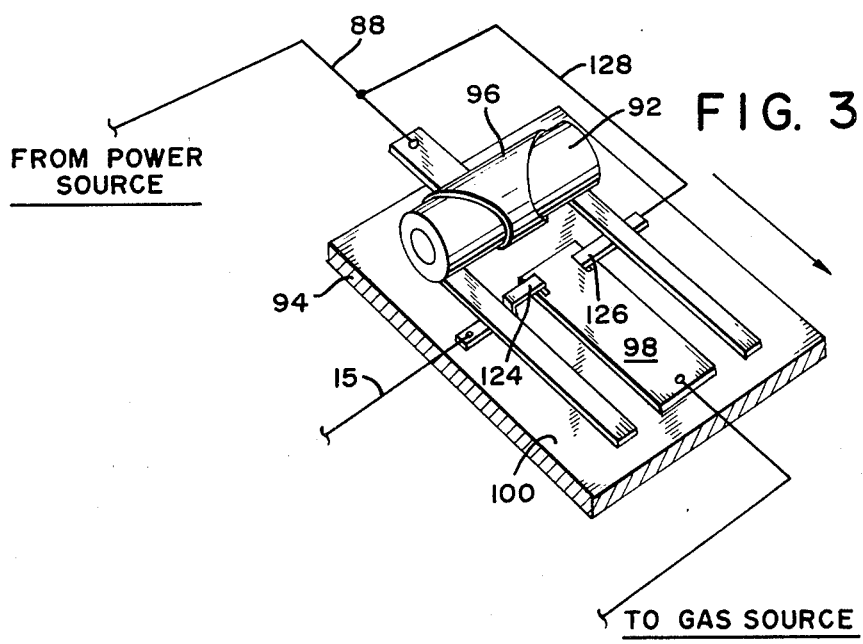
FIG. 3 is an isometric view of a control element for use with the apparatus of FIG. 1.

In FIG. 3 there is illustrated one type of control element which comprises the control means. Such control element comprises at least one roller 92 of metal such as stainless steel, gold plated copper, or other suitable conductive material. The roller 92 is adapted to be electrically connected to the power source 12 by the impact detecting means 14 and is movably mounted on a nonconductive support 94 of the same material as support 89. A thin band 96 of electroconductive material, such as stainless steel, gold plated copper, or the like, wrapped around roller 92 and spotwelded or otherwise secured to support 94 provides a resisting force against which the roller 92 acts. Such resisting force, hereinafter referred to as the second resisting force, has a magnitude at least equal to and preferably greater than the first resisting force. Resistance element 98 is electrically connected through the second circuit means and lines 30 and 32 to the second gas releasing means 34 and actuating means 40, respectively. As roller 92 is displaced along the surface 100 of support 94 in the direction of the arrow, band 96 is brought into contact with a variable portion of resistance element 98. Due to the second resisting force provided against roller 92 by band 96, the displacement distance of roller 92 can be made directly proportional to the impact velocity of a vehicle carrying apparatus 10. As the impact velocity is increased, roller 92 is displaced further along support 94 in the direction of the arrow. The electrical current from power source 12 passes through a correspondingly larger portion of band 96 and through a correspondingly smaller portion of the resistance element 98. Accordingly, the electrical current is transmitted from the power source 12 through line 88, impact detector 14, line 15, control element 33 and (1) a second circuit means comprising transmission circuit 26 and lines 28 and 30 to the second gas releasing means 34, as well as (2) transmission circuit 26, line 28 and line 32 to actuating means 40 during a shorter time interval.

It will be understood that the current from the power source 12 which is directed by impact detector 14 through the first circuit means to the first gas releasing means 22 and through lines 16 and 20 to actuating means 38 is not variably delayed in the same manner. Thus, at lower impact velocities the electrical current reaches and fires detonator 76 and squib 52 before reaching and firing detonator 82 and squib 56. At such velocities, gas 46 is generated in and released from the first gas source 24 before production and release of gas from the second gas source 36 commences. The time interval between production and release of gas from the first gas source 24 and production and release of gas from the second gas source 36 is, in effect, the time interval during which the current passes from the power source 12 through the second circuit means to the second gas releasing means 34 and through transmission circuit 26 and lines 28 and 32 to actuating means 40. Control element 33 cooperates with the transmission circuit 26 to make that time interval vary in inverse proportion to the impact velocity of the vehicle. Inasmuch as impact detector 14 and control element 33 are differently responsive to the impact velocity, the current may pass through the first and second circuit means during respectively different time intervals. Alternatively, for relatively high impact velocities the current may be caused to pass through the first and second circuit means during substantially the same time interval.

A unique means is thereby provided for varying the time differential between inflation of the first inflatable bag 48 and the second inflatable bag 50 in inverse proportion to the impact velocity of the vehicle. Such means provide increased control over the position of the occupant upon inflation of the second (torso) bag 50. At relatively low impact velocities, as in the order of impact velocities ranging from 10 to 20 mph, the first (knee) bag 48 inflates from about 25 to 15 milliseconds prior to the second (torso) bag 50, thereby moving the occupant into an upright seated position before the second (torso) bag is substantially inflated. The sequential deployment of the first and second bags 48 and 50 serves to prevent an occupant that is leaning toward or standing behind the instrument panel from rebounding off of the second (torso) bag 50 and into hard portions of the vehicle. At relatively high speed impacts, as in the order of impact velocities ranging from 20 to 40 mph, the time differential between inflation of the first and second bags 48 and 50 is decreased to about 15 to 5 milliseconds. The bags function primarily to move the occupant away from the dashboard or other hard portions of the vehicle to prevent contact therewith prior to deployment of the bags. The shortest time differential occurs at impact velocities in excess of a preselected maximum, that is, impact velocities above about 60 miles per hour. For such impact velocities, the time differential between inflation of the first and second bags is substantially zero.

In FIG. 4 there is shown, schematically, an electrical diagram of the first and second circuit means. The electrical current from power source 12, line 88 passes through switch means 102 which is thrown in the direction of the arrow by impact detector 14. The electrical current then passes through line 15 and the first circuit means to detonator 76 of the first gas releasing means 22 and through lines 15, 16 and 20 to squib 52 of actuating means 38. Current from power source 12, line 88, impact detector 14 and line 15 passes through resistor 104, silicon controlled rectifier 106, and variable resistor 108, charging capacitor 110. When the peak point of unijunction transistor 112 is reached, the current is emitted from the unijunction transistor 112 in the form of an electrical pulse, which passes through resistor 114 to silicon controlled rectifier 116. Such pulse produces a voltage at the gate of silicon controlled rectifier 116, which allows the current to flow through line 118, silicon controlled rectifier 116 and line 28 to (1) line 30 and bridge wire 82 of second gas releasing means 34 and (2) line 32 and bridge wire 58 of actuating means 40. Resistors 104 and 114 limit current passing through the gates of silicon controlled rectifiers 106 and 116, respectively. Resistor 122 functions to bleed down the capacitor 110 during shutdown when power is not supplied to the apparatus 10 by source 12.

The apparatus 10 which has been disclosed herein can, of course, be modified in numerous ways without departing from the scope of the invention. As mentioned hereinabove, the number of bags and the number of gas generating charges employed can vary from as few as two to as many as ten or more. Transmission circuit 26 could be simplified by eliminating resistor 104, silicon controlled rectifier 106 and resistor 122. Control element 36 may be provided with a separate switch means (not shown) connected to power source 12 and adapted to operate independently of switch means 44 to cause the electrical current to pass to the second circuit means upon impact of the vehicle. Further, each of the impact detector 14 and the control element 33 may be provided with the same roller. For example, as shown in FIG. 3, control element 33 may be provided with a switch 124 mounted on support 94 below roller 92. Upon contact with roller 92, the electrical current from power source 12 and line 88 passes through switch 124 to line 15. An electroconductive member such as an additional switch 126 connected to line 88 by line 128 can be mounted on support 94 below roller 92. Upon contact with roller 92 switch 126 can be made to connect line 88 and line 128 with resistance element 98 for a preselected time interval of longer duration than the time interval during which the current passes through the second circuit means to the second gas releasing means 34. Accordingly, in this embodiment, the time interval during which the electrical current passes from line 88 to the resistance element 98 will be of at least the same duration as the time interval during which the current passes from line 88 through the second circuit means to the second gas releasing means 34, even if the resistor 104, silicon controlled rectifier 106 and resistor 122 are eliminated from the transmission circuit 26. Such modifications are intended to fall within the scope of the invention as defined by the subjoined claims.

In operation, forces resulting from impact of a vehicle in which apparatus 10 is disposed displace roller 86 against the first preselecting resisting force and along the surface 94 of support 89 until band 90 is brought into contact with conductive element 92. An electrical current is transmitted during a fixed time interval from power source 12 through (1) line 88, impact detector 14 and lines 15, 16 and 18 to bridge wire 78 of first gas releasing means 22 and (2) line 88, impact detector 14 and lines 15, 16 and 20 to bridge wire 54 of actuating means 38. Bridge wire 78 heats and detonates the detonator 76 and bridge wire 54 heats and ignites the squib 52 upon receipt of the electrical current. Detonation of detonator 76 dislodges the plug 74, whereupon an orifice (not shown) is created in communication with the gas containing portion and a conduit 130. Ignition of squib 52 causes production of generated gas to commence. The gas pressure within the gas generating compartment housing charge 42 increases to a preselected level, barrier 60 ruptures, and generated gas flows through first diffuser 64 into the gas containing portion of first gas source 24. The pressurized and generated gases flow through the conduit 130 and into bag 48.

If forces resulting from impact of the vehicle are greater in magnitude than the second preselected resisting force, roller 92 is displaced along the surface 100 of support 94 until band 96 contacts resistance element 98. The electrical current is transmitted from power source 12 through (1) line 88, impact detector 14, line 15, control element 33, transmission circuit 26 and lines 28 and 30 to bridge wire 84 and (2) line 88, impact detector 14, line 15, control element 33, transmission circuit 26 and lines 28 and 32 to bridge wire 58 during a variable time interval controlled by control element 33. Detonator 82 of second gas releasing means 34 is heated and ignited by the bridge wire 84 upon receipt of the electrical current. Bridge wire 58 heats and ignites squib 56 upon receipt of the electrical current.

The squib 56 ignites gas generating charge 44 and production of the generated gas commences. The gas pressure within the gas generating compartment housing charge 44 increases to a preselected level, barrier 62 ruptures, and gas generated from charge 44 flows through the diffuser 66, the gas containing portion and the conduit 132 into bag 50.

Having thus described the invention in rather full detail, it will be understood that these details need not be strictly adhered to but that various changes and modifications may suggest themselves to one skilled in the art, all falling within the scope of the invention as defined by the subjoined claims.

I claim:

1. Multiple bag inflation apparatus adapted to be disposed in a vehicle subject to impact for inflating a plurality of bags, the time differential between inflation of the bags varying inversely with the impact velocity of the vehicle, comprising:
   a. a power source for supplying an electrical current;
   b. a first inflatable bag for protecting the legs of an occupant of said vehicle;
   c. a second inflatable bag for protecting the torso of the occupant;
   d. a first gas source for supplying inflating gas to said first inflatable bag;
   e. a second gas source for supplying inflating gas to said second inflatable bag;
   f. first gas releasing means connected to said first gas source for permitting inflating gas to flow into said first inflatable bag upon receipt of the electrical current;
   g. second gas releasing means connected to said second gas source for permitting inflating gas to flow into said second inflatable bag upon receipt of the electrical current;
   h. first circuit means for transmitting the electrical current from said power source to said first gas releasing means during a fixed first time interval;
   i. impact detecting means for causing the current to pass to said first circuit means upon impact of the vehicle;
   j. second circuit means for transmitting the current from said power source to said second gas releasing means during a second time interval;
   k. control means associated with said second circuit means and being responsive to the impact velocity of the vehicle, for varying the second time interval in inverse proportion to the impact velocity.

2. Apparatus as recited in claim 1, wherein the impact detecting means comprises a moveable electroconductive material electrically connected to said power source and means for displacing said material against a preselected resisting force and into contact with an electroconductive element electrically connected to said first gas releasing means.

3. Apparatus as recited in claim 2, wherein said control means comprises a moveable electroconductive material electrically connected to the power source, a resistance element connected at one end to said second circuit means, and means for displacing said electroconductive material against a preselected resisting force and into contact with a variable portion of the resistance element, the portion contacted varying in direct proportion to the distance that the electroconductive material is displaced by forces resulting from impact of the vehicle.

4. Apparatus as recited in claim 3, wherein the resisting force against which said electroconductive material of said control means is displaced has a magnitude at least as great as the resisting force against which said electroconductive material of said impact detecting means is displaced.

5. Apparatus as recited in claim 3, wherein said electroconductive material of said impact detecting means and said electroconductive material of said control means are each displaced against a resisting force of different magnitude, whereby said impact detecting means and said control means are differently responsive to said impact velocity.

6. Apparatus as recited in claim 3, wherein said control means includes an electroconductive member electrically connected to said power source, means for displacing said electroconductive material of said control means into contact with said member, and means for holding said member in contact with a preselected portion of the resistance element for at least the time interval during which said current is transmitted through said second circuit means.

7. Apparatus as recited in claim 1, wherein said control means comprises a moveable electroconductive material electrically connected to the power source, a resistance element connected at one end to said second circuit means and means for displacing said electroconductive material against a preselected resisting force and into contact with a variable portion of the resistance element, the portion contacted varying in direct proportion to the distance that the electroconductive material is displaced by forces resulting from impact of the vehicle.

8. Apparatus as recited in claim 7, wherein the other end of said resistance element is electrically connected to said first circuit means.

9. Apparatus as recited in claim 1, wherein said second circuit means includes a transmission circuit connected to a control element, said transmission circuit comprising a variable resistor in series with means for transmitting an electrical current to said second gas releasing means.

10. Apparatus as recited in claim 9, wherein said electrical current is transmitted by means which include a unijunction transistor and a rectifier in series with said resistor and a bridge wire connected to said second gas releasing means, and a capacitor connected in parallel with said power source.

11. Apparatus as recited in claim 10, wherein said control means includes means for transmitting said current from said power source to said second gas releasing means, the time interval for said transmission being of at least the same duration as the time interval during which said electroconductive material contacts said resistance element.

12. Apparatus as recited in claim 11, wherein each of said first and second gas sources includes a gas containing portion provided with pressurized gas, a gas generating portion provided with a gas generating charge and an actuating means connected to said charge for igniting the charge upon receipt of said electrical current, said actuating means of said first gas source being electrically connected to said first circuit means and said actuating means of said second gas source being electrically connected to said second circuit means.

13. Apparatus as recited in claim 12, wherein each of said gas sources includes a housing enclosing said gas containing and generating portions, and each of said gas releasing means comprises a plug removably mounted in the housing, said plug extending through a full thickness of said housing and into contact with said pressurized gas, a detonator located adjacent to said plug, and a bridge wire structurally connected to said detonator and electrically connected to said impact detecting means, for detonating said detonator upon passage of said electrical current through said bridge wire, whereby said plug is removed from said housing.

14. Apparatus as recited in claim 13, wherein said actuating means of said first gas source comprises a squib disposed adjacent to a first gas generating charge and a bridge wire structurally connected to the squib and electrically connected to said first circuit means, for igniting said squib upon receipt of said electrical current.

15. Apparatus as recited in claim 14, wherein said actuating means of said second gas source comprises a squib disposed adjacent to a second gas generating charge, and a bridge wire structurally connected to said squib and electrically connected to said second circuit means, for igniting said squib upon receipt of said electrical current.

16. Apparatus as recited in claim 15, wherein said gas containing portion and said gas generating charge are respectively disposed within separate compartments of said housing, and said compartment in which said charge is housed includes a pressure sensitive barrier, said barrier providing said compartment with a wall separating said charge from said pressurized gas, whereby means are provided for permitting gas generated within said compartment to flow into said gas containing portion.

17. A method of inflating a plurality of inflatable means disposed in a vehicle subject to impact, comprising the steps of:
  a. transmitting an electrical current from a power source to a first gas releasing means connected to a first gas source during a fixed first time interval to effect release of inflating gas into a first inflatable means adapted to protect the legs of a vehicle occupant upon impact of the vehicle;
  b. transmitting an electrical current from the power source to a second gas releasing means connected to a second gas source during a second time interval to effect release of inflating gas into a second inflatable means adapted to protect the torso of the occupant upon said impact; and
  c. controlling the second time interval in response to the impact velocity of said vehicle to vary the second time interval in inverse proportion to said impact velocity.

* * * * *